Feb. 12, 1952 M. B. MENTLEY 2,585,261
GEAR-FINISHING METHOD
Filed Dec. 9, 1946 5 Sheets-Sheet 4

INVENTOR.
MAX B. MENTLEY
BY
Whittemore, Hulbert
& Belknap
ATTORNEYS

INVENTOR.
MAX B. MENTLEY
BY
Whittemore, Hulbert
& Belknap ATTORNEYS

Patented Feb. 12, 1952

2,585,261

UNITED STATES PATENT OFFICE 2,585,261

GEAR-FINISHING METHOD

Max B. Mentley, Detroit, Mich., assignor to National Broach & Machine Company, Detroit, Mich., a corporation of Michigan Application December 9, 1946, Serial No. 714,925

2 Claims. (Cl. 90—1.6)

1

The present invention relates to a gear finishing method and more particularly to one adapted to employ a rotary tool and work piece engaged at crossed axes which during operation of the machine are caused to partake of a relative traverse in a direction oblique to the axes of both work piece and cutter.

The present invention may conveniently be applied to a gear shaving machine of the type disclosed in the copending application Serial No. 694,590 filed September 3, 1946, entitled "Gear Finishing Machine" in which the applicant is Kenneth J. Davis and which is assigned to the assignee herein.

For purposes of completeness the description of the entire machine will be given, although the present invention is limited primarily to apparatus for effecting stoppage of the machine at a substantially invariable predetermined point of traverse so as to effect a gauging operation.

It is an object of the present invention to provide a method of the character described employing a rotary tool support and a rotary work support adapted to be associated at crossed axes and to partake of a relative traverse in a plane which is parallel to both axes and in a direction which is transverse to the axes of both gear and cutter, in which means are provided for effecting an automatic gauging operation by the simple expedient of loading an unfinished gear on the work spindle and manually testing for backlash.

Other objects and features of the invention will become apparent as the description proceeds, especially when taken in conjunction with the accompanying drawings, wherein.

Figure 1:
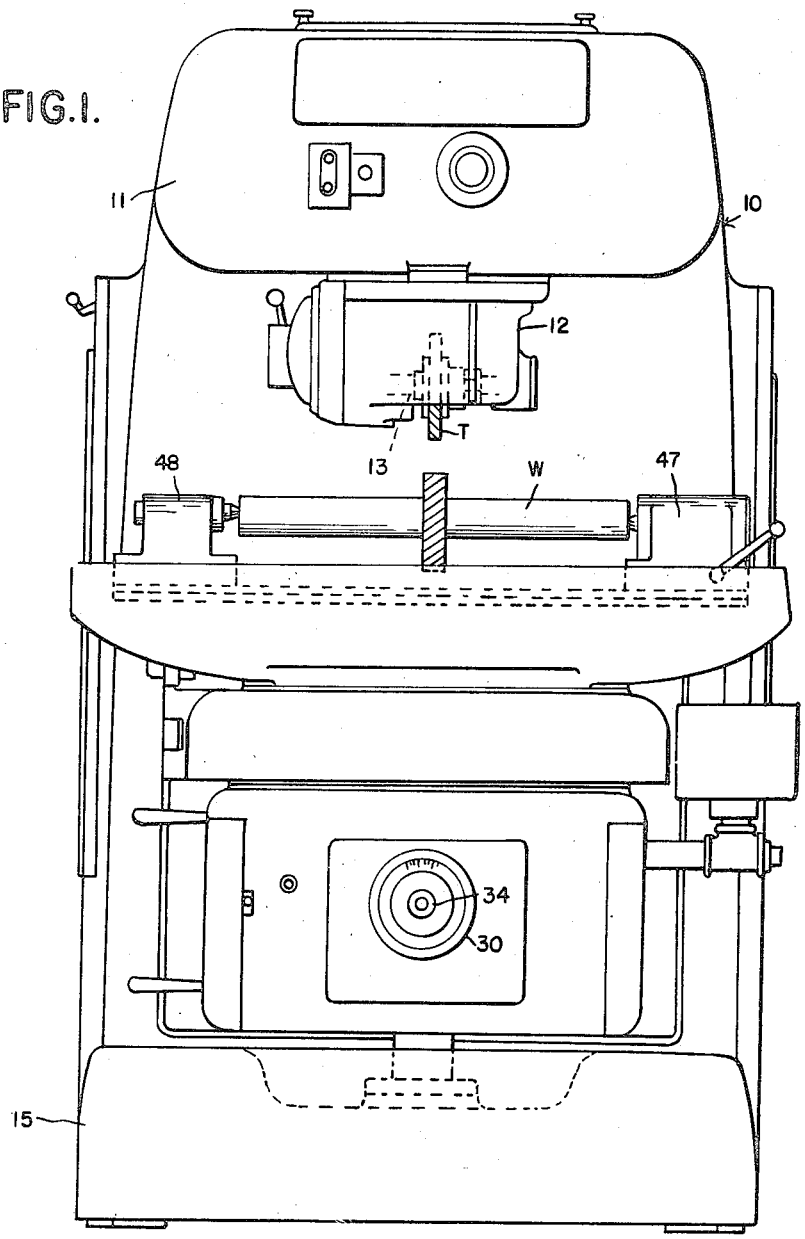
Figure 1 is a front elevation of a machine tool constructed in accordance with the present invention.
Figure 2:
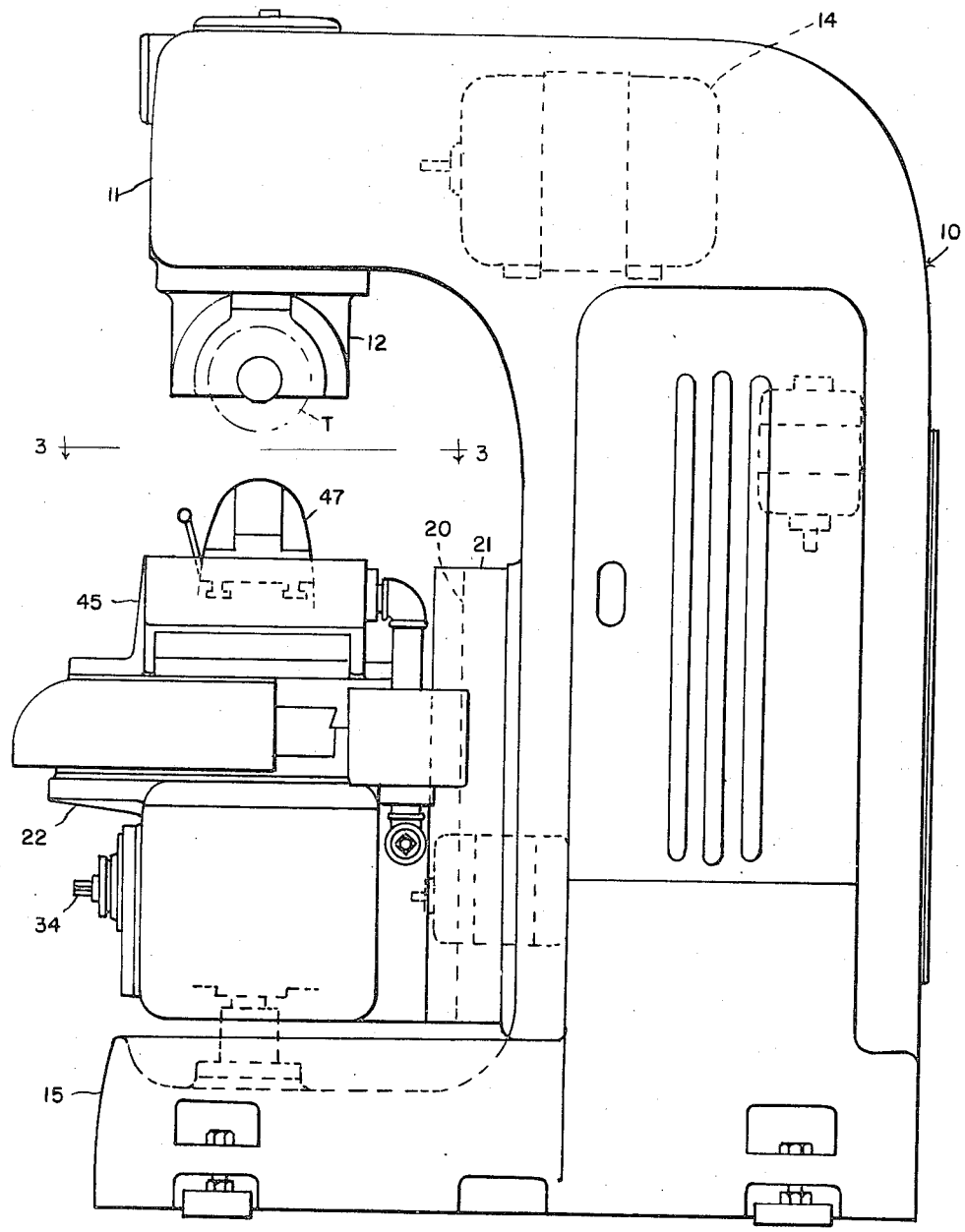
Figure 2 is a side elevation of the machine tool shown in Figure 1.

Referring first to Figures 1 and 2, the machine tool comprises a main frame 10 having an overhanging portion 11 to which is secured a tool support 12 having driving connections (not shown) for rotating the tool T supported on a rotary tool spindle 13. The tool support 12 is mounted for adjustment about a vertical axis passing through the axis of the tool spindle 13 and preferably substantially centrally of the tool T carried thereby. A tool support of this general type is disclosed in patent to Robert S. Drummond, No. 2,270,421 dated January 20, 1942, and accordingly is not described in detail here.

It will be noted, however, that independent motor means for effecting rotation of the tool spindle are provided as indicated at 14.

The base of the frame 10 extends forwardly as indicated at 15 and contains a fixed nut element (not shown) for cooperation with an adjustment screw for effecting vertical adjustment of the work support, as will presently be described.

Figure 4:
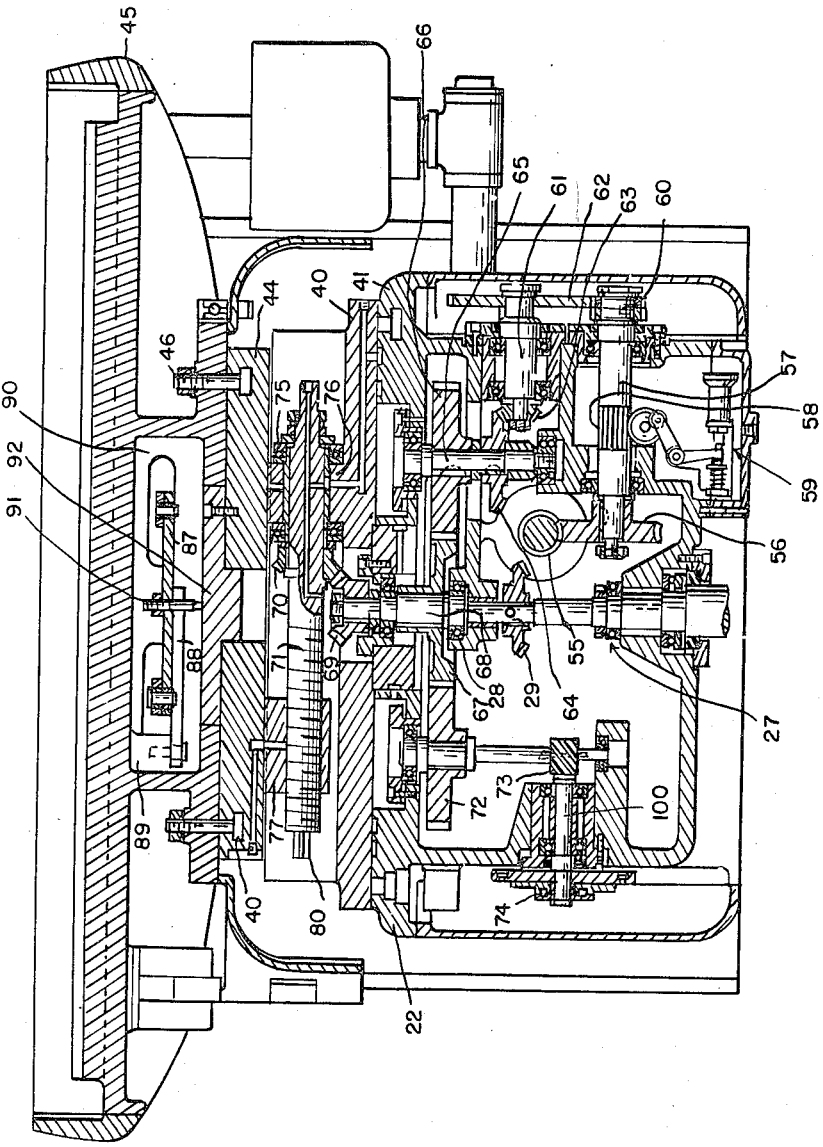
Figure 4 is a section on the line 4—4 of Figure 3.
Figure 5:
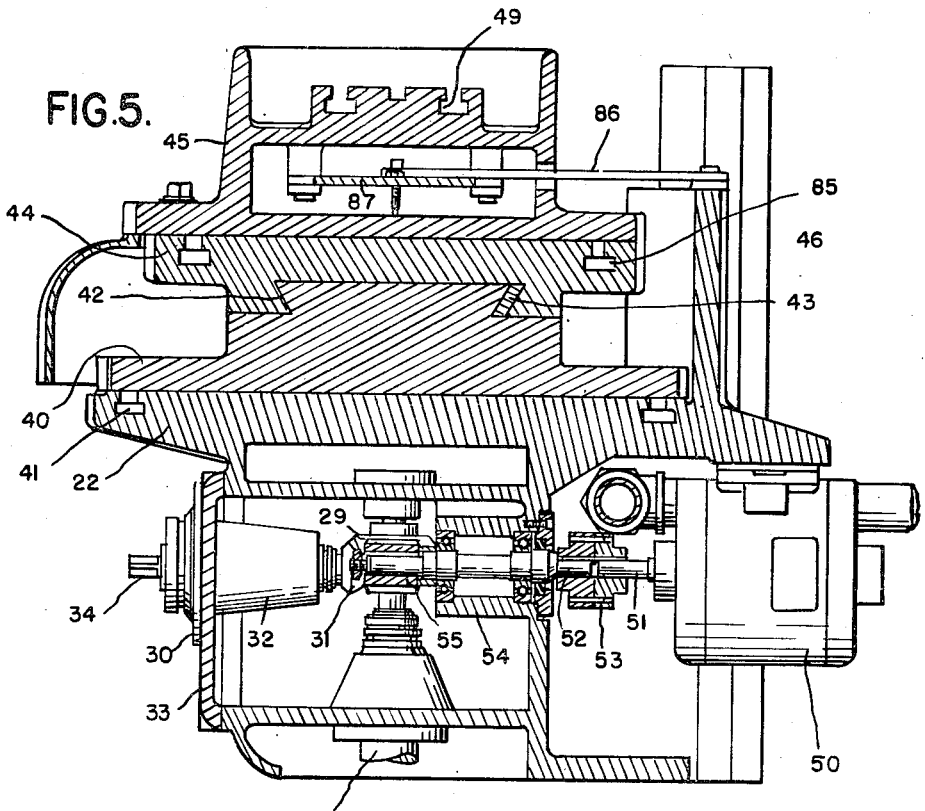
Figure 5 is a section on the line 5—5 of Figure 3.

Mounted on ways 20 formed in a plate 21 secured to the upright portion of the frame 10 is a knee 22. Means for effecting vertical adjustment of the knee, as best seen in Figure 5, comprises a vertically extending adjusting screw 26 which is mounted for rotation relative to the knee and at the same time locked against axial movement relative thereto by bearing means indicated generally at 27 (Figure 4). The upper end of the screw 26 is supported in bearings 28 and a bevel gear 29 is keyed thereto. Manual means indicated generally at 30 are provided for effecting rotation of the screw 26 and comprises a bevel gear 31 meshing with the bevel gear 29 carried by a shaft extending through bearing structure 32 and a closure plate 33 carried by the knee and terminating in a squared end indicated at 34 for cooperation with a suitably formed tool. It will be apparent that rotation of the shaft having the squared end 34 by a hand tool will effect rotation of the screw 26, and that this rotation relative to the fixed feed nut previously described will result in vertical adjustment of the knee 22.

Mounted on the knee 22 for adjustment about a vertical axis thereon is a first sub-table 40 and means are provided for locking the sub-table 40 in adjusted position relative to the knee 22 which comprises a circular T slot 41 provided on the knee 22 and suitable locking bolts carried by the sub-table and having head portions received within the bottom of the T slots 41. The first sub-table 40 is provided at its upper surface with rectilinear ways 42 including a removable gib 43. A second sub-table 44 is shaped to cooperate with the ways 42 and gib 43 for rectilinear translation along the sub-table 40.

Mounted for adjustment about a vertical axis on the top of the second sub-table 44 is a work table 45 and means are provided for locking the work table 45 to the second sub-table 44 which take the form of a second circular T slot 46 formed in the upper surface of the second sub-table 44, suitable clamping bolts 46' being carried by the work table 45 for effecting locking of the work table in adjusted position.

The work table 45 is provided with rectilinear T slots 49 for adjustably receiving a headstock 47 and tailstock 48. The headstock 47 and the tailstock 48 comprise means for supporting a rotary work piece indicated at W in Figure 1 in proximity to the location of the tool T. It will be observed from an inspection of Figure 1 that in order to effect engagement between tool T and the work W as illustrated it is necessary to raise the knee by appropriate turning of the feed screw 26. It will also be apparent that in order to effect engagement between the tool and the work at crossed axes it is best to effect a desired rotation of the tool support 12 so as to bring the axis of the tool T into a desired crossed axial relationship with respect to the work without disturbing orientation of the work.

Referring now to Figures 4 and 5, means are provided for effecting relative traverse between the tool and work and more specifically for effecting translation of the work table 45. This means comprises a motor 50 mounted on the knee 22 for vertical adjustment therewith and having a drive shaft 51 connected to a second shaft 52 by a coupling 53. The shaft 52 is supported in bearings indicated generally at 54 and terminates in a worm 55 which in turn drives a worm gear 56 (Figure 4). The gear 56 is mounted on a shaft 57 having a toothed driving portion 58 connected to oil pumping means indicated generally at 59. Secured to the opposite end of the shaft 57 is a pinion 60 which drives a shaft 61 through an intermeshing gear 62. The shaft 61 carries a bevel gear 63 meshing with a second bevel gear 64 carried by a vertical shaft 65 to which is keyed or otherwise secured a gear 66. The gear 66 in turn meshes with a gear 67 keyed or otherwise secured to a shaft 68 at the upper end of which is keyed or otherwise secured a bevel gear 69. The bevel gear 69 meshes with a bevel gear 70 which is keyed to a feed screw 71 which is mounted for rotation and held against axial translation relative to the first sub-table 40 by bearings indicated at 75 engaging opposite sides of a supporting shoulder structure 76.

The second sub-table 44 has rigidly secured thereto in depending relation a feed nut 77 which threadedly engages the feed screw 71. Opposite ends of the feed screw 71 are provided with squared ends as indicated at 80 for suitable engagement by a hand tool for a purpose which will later appear.

From the foregoing description it will be apparent that rotation of the shaft 51 by the motor 50 results in rotation of the feed screw 71, and since this feed screw is held against axial movement, its rotation will result in a timed traverse of the second sub-table 44 along the ways 42 previously described.

The circular T slot 41 provided in the upper surface of the knee 22 is coaxial with the shaft 68 and accordingly rotation of the first sub-table 40 about this axis relative to the knee 22 may be effected without disturbing the train of gears interconnecting the motor 50 and the feed screw 71.

The circular T slot 46 formed in the upper surface of the second sub-table 44 has an axis parallel to an axis of the shaft 68 and which coincides with the axis of the shaft 68 when the sub-table 44 is in central position.

It is desired to change the direction of traverse of the work table 45 in a horizontal plane without disturbing its orientation in order that long work pieces may be accommodated by the machine. Thus for example in the event that a gear to be finished is formed integrally on a long shaft the shaft may be mounted between centers or mounted in a special support adapted to receive intermediate portion of the shaft without giving rise to a problem of interference between the extending portion of the shaft and fixed portions of the machine during the desired traverse. It is pointed out at this time that the traverse mechanism illustrated provides for the complete adjustment of the direction of traverse so that the work piece may be caused to move from its central position in any direction through the complete arc of 360°.

The gear 67 engages a gear 72 which through suitable gearing indicated generally at 73 actuates timing means 74 for effecting control of the motors.

It will be observed that adjustment of the sub-tables 40 and 44 as a unit about a vertical axis will result in the rotation therewith of the feed screw 71 and the machine is so designed that either one end or the other of the feed screw 71 is always in a position where it may be engaged by a suitable hand tool. This provides means for effecting a fine adjustment of the sub-tables relative to the machine, as will now be described. When the motor 50 is stopped, due to the fact that the drive therefrom includes a worm and worm gear, the gear train connecting the motor and the feed screw 71 is effectively locked against a rotation initiated from the feed screw end thereof. Accordingly, when the feed screw 71 is rotated by hand it will result in rotation of the sub-tables 40 and 44 as a unit, this adjustment being effected by the bevel gear 70 meshing with the bevel gear 69, which at this time is effectively locked against rotation. It is recognized of course that rotation of the feed screw 71 besides effecting the desired angular adjustment of the sub-tables 40 and 44 will also effect a very slight lateral displacement of the sub-table 44 with respect to the sub-table 40 due to the engagement between the feed screw 71 and the feed nut 77. This movement is, however, inconsiderable and presents no difficulties.

Figure 3:
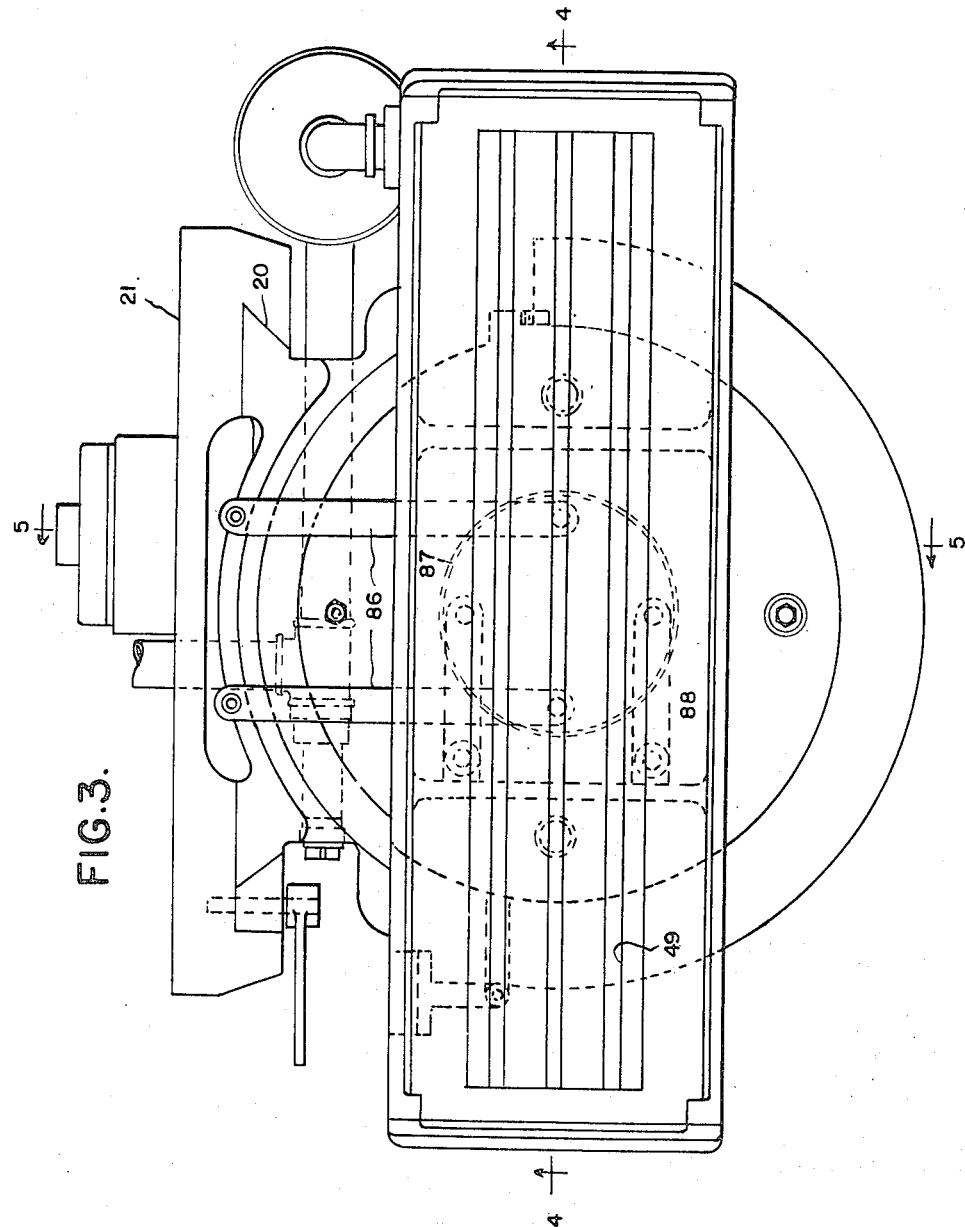
Figure 3 is a fragmentary plan view of the work supporting mechanism as indicated by the line 3—3 of Figure 2.

In order that the work table 45 will be maintained substantially in its oriented position, linkage mechanism best illustrated in Figures 3, 4 and 5 is provided. As seen in these figures, the knee has formed thereon an upwardly extending plate 85 to which are secured a pair of parallel movable links 86 which at their opposite ends are secured to a disc 87. A second pair of short links 88 are pivoted to a shoulder 89 formed in a recess 90 formed adjacent the bottom of the work table 45. The disc 87 is freely movable within the recess except as its movements are controlled by links 86 and 88 and supported for such movement by a central screw 91 which bears on a closure plug 92 closing the open bottom of the recess 90. As best seen in Figure 3, it will be apparent that the linkage thus referred to will maintain the work table 45 always in a substantially oriented position in its horizontal plane.

It is contemplated that in adjustment of the machine the feeding or traversing mechanism which comprises the first and second sub-tables 40 and 44 will be adjusted to cause the ways 42 to extend in the desired direction of traverse of the work table. This adjustment of the sub-tables as a unit tends to rotate the work table 45 therewith, but such rotation is effectively prevented by the linkage mechanism referred to. After the adjustment of the traverse mechanism has been completed the bolts which extend into the circular T slots 41 and 46 are tightened, thus locking the parts in adjusted position. Subsequently thereto the tool supporting head 12 may be adjusted about its own vertical axis of adjustment to bring the axis of the tool into the precise crossed axial relationship desired with respect to the axis of the work piece.

Figure 6:
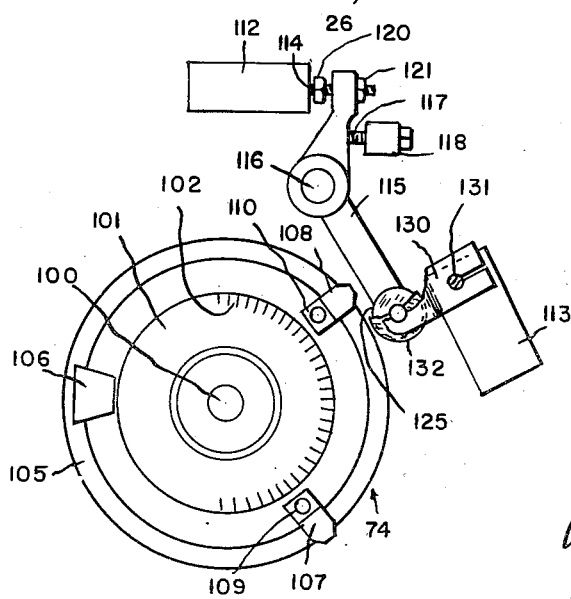
Figure 6 is a diagrammatic view of the cycle controlling mechanism employed in the machine.

Referring now to Figure 6, the timing or cycle controlling mechanism comprises a dial 101 secured to the shaft 100, the dial preferably having suitable graduations as indicated at 102 to facilitate setting. These graduations may conveniently be in inches and determine the length of stroke. The dial 101 is mounted in a recessed boss 105 formed on the main casting of the machine, and projecting inwardly from the boss 105 is a stop 106 whose function is to prevent improper setting of the timing dogs 107 and 108. The dogs 107 and 108 are mounted for adjustment on the dial 101, suitable securing means being indicated at 109 and 110, respectively. It will be appreciated that the dogs 107 and 108 each have offset portions lying in different planes of rotation which are respectively adapted to actuate one or the other of the two switches.

Mounted on the frame of the machine adjacent the boss 105 is a safety limit switch 112 and a stopping and reversing switch 113. The safety switch 112 has a plunger 114 which is adapted to be actuated by a bell crank lever 115 mounted for rocking movement about a pivot pin 116. The bell crank 115 is supported in inoperative position against an adjustable set screw 117 mounted in a projection 118 formed on the frame of the machine. At one end the bell crank 115 has an adjustable actuating bolt 120 which is threaded through an opening adjacent the end of the bell crank and retained in adjusted position by a lock nut 121. The other end of the bell crank 115 carries a roller 125 which is adapted to be engaged by one of the dogs 107 or 108 in the event that the stopping and reversing switch 113 fails to operate.

The stopping and reversing switch 113 has a lever 130 provided therewith as indicated at 131 and carries at its free end a roller 132 adapted to be engaged by dogs 107 and 108. The dogs 107 and 108 have surfaces respectively adapted to engage the roller 132, and other surfaces adapted to engage the roller 125 shortly thereafter in the event of failure of the reversing switch 113. The circuit for the motor 50 includes the switches 112 and 113, and the switch 113 has associated therewith a suitable plugging relay for the purpose of arresting rotation of the motor 50 immediately upon actuation of the switch 113 to stop the motor upon termination of a cycle. The cycle for this particular machine involves a single back-and-forth reciprocation of the slides to effect two relative traverses between the gear and cutter. By employing the plugging relay referred to, the work support comes to rest substantially in identical position upon completion of each cycle of the machine.

As a result of the fact that the termination of each cycle takes place with the axes of the cutter and gear in substantially predetermined position, it is possible to employ this relationship as a gauging means to prevent accidental placement of an oversize work piece on the machine. It will be recalled that in the present machine the tool spindle is positively driven and the work spindle is mounted for free rotation. Accordingly, when a new work piece is located on its spindle in mesh with the gear-like cutter carried by the tool spindle, a predetermined amount of backlash will be present depending first upon the position of the dog 107 which determines the stopping point of the work support, and second upon the dimensions of the rough gear to be finished.

It will be recalled that the present machine is particularly well adapted to take a very heavy cut and to complete a rough gear in a single back-and-forth traverse. However, in the event that one or more oversize gears is present in a group being processed, severe damage could be caused to the machine by initiating its operation. In accordance with the present invention the operator can determine immediately whether or not each gear which he places upon the work spindle is within safe limits by the simple expedient of testing it by hand for backlash, and if less than the usual or a minimum amount of backlash is present it will be apparent immediately that the gear is oversize and should be subjected to further roughing operations before being finished on the shaving machine.

This means of gauging for oversize gears is possible with the present machine due to the fact that the machine is normally operated with a direction of traverse forming a very substantial angle with the axes of both gear and cutter so that upon completion of the cutting part of a stroke a very limited additional traverse moves the gear and cutter to very substantial backlash without moving the parts out of mesh. It is thus possible to employ this predetermined amount of backlash resulting from a small additional amount of relative traverse as a gauging means without introducing a serious loss of time in the cycle. Furthermore, the present machine is adapted to finish gears without a feeding movement reducing the normal spacing of tool and work axes, so that this spacing, which enters into the provision of constant backlash at end of cycle, is invariable for a sequence of like gears.

While the present invention has been illustrated and described in conjunction with a particular gear shaving machine, it will be appreciated that this has been done merely to enable those skilled in the art to practice the invention, which is applicable to a wide variety of gear finishing machines and is not to be construed as limited to the particular machine illustrated and described herein. The true scope of the invention is indicated in the appended claims.

What I claim as my invention is:

1. The method of initially gauging and then finishing a series of gears by rotating them in mesh at crossed axes with a gear-like finishing tool which comprises providing a pair of supports for said gear and tool in definitely spaced relation representing a predetermined backlash between the tool and a gear of proper size for machining, one of said supports having a tool thereon, mounting a succession of gears on said other support, testing the gears for backlash, removing any gears which are dangerously oversize, effecting relative back-and-forth traverse between gears of proper size and the tool in a direction which occupies a plane parallel to the axes of said gear and tool, which direction is oblique to the axes of both gear and tool while rotating the gear and tool in mesh, and arresting said traverse with said supports in the relative position representing said predetermined backlash.

2. The method of initially gauging and then finishing a series of gears by rotating them in mesh at crossed axes with a gear-like finishing tool which comprises adjusting a rotary tool support and a rotary work support in crossing relationship and to a normal spacing proper to machine work gears carried by the work support to a predetermined size by a gear-like tool carried by the tool support, relatively adjusting said supports in traverse in a plane parallel to the axes of both of said supports to a loading position which provides a small amount of backlash between the tool and an unfinished work gear of dimensions suitable for finishing, placing unfinished work gears on the work support serially, testing for oversize gears by checking backlash manually by relatively rotating each meshed gear and tool, removing oversized gears, finishing proper size gears by driving one support in rotation, thereby driving the other support through the meshed engagement of gear and tool, effecting one or more complete back-and-forth traverse strokes between said supports in a direction which occupies a plane parallel to the axes of the supports and which direction is oblique to the axes of both supports, and terminating each traverse sequence accurately in the predetermined loading position to provide for a backlash check of the succeeding work gear.

MAX B. MENTLEY.

REFERENCES CITED

The following references are of record in the file of this patent:

UNITED STATES PATENTS

| Number | Name | Date |
| --- | --- | --- |
| 2,270,421 | Drummond | Jan. 20, 1942 |
| 2,335,215 | Schurr | Nov. 23, 1943 |
| 2,350,882 | Drummond | June 6, 1944 |
| 2,380,208 | Ashton | July 10, 1945 |
| 2,435,405 | Praeg | Feb. 3, 1948 |

FOREIGN PATENTS

| Number | Country | Date |
| --- | --- | --- |
| 480,247 | Great Britain | Feb. 14, 1938 |